US012774010B2

(12) United States Patent

Gupta et al.

(10) Patent No.: US 12,774,010 B2
(45) Date of Patent: Oct. 27, 2026

(54) CONTROLLING SENSOR FUSION FOR AUTOMATED VEHICLE TECHNOLOGY

(71) Applicant: Toyota Motor Engineering & Manufacturing North America, Inc., Plano, TX (US)

(72) Inventors: Rohit Gupta, Santa Clara, CA (US); Akila C. Ganlath, Fremont, CA (US); Qi Chen, San Jose, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 1 day.

(21) Appl. No.: 18/969,785

(22) Filed: Dec. 5, 2024

(65) Prior Publication Data

US 2026/0159117 A1 Jun. 11, 2026

(51) Int. Cl.
*B60W 60/00* (2020.01)
*B60W 30/182* (2020.01)
(Continued)

(52) U.S. Cl.
CPC ........ *B60W 60/001* (2020.02); *B60W 30/182* (2013.01); *B60W 50/029* (2013.01);
(Continued)

(58) Field of Classification Search
CPC ............. B60W 60/001; B60W 30/182; B60W 50/029; B60W 50/14; B60W 2050/0292;
(Continued)

(56) References Cited

U.S. PATENT DOCUMENTS 6,889,171 B2 5/2005 Skrbina et al.
12,283,097 B1 * 4/2025 Song ...................... G06V 10/82
(Continued)

FOREIGN PATENT DOCUMENTS

CN 108697365 A 10/2018

OTHER PUBLICATIONS

Guo et al., MEMS reservoir computing system with stiffness modulation for multi-scene data processing at the edge, Jun. 24, 2024, Microsyst Nanoeng 10, 84 (2024), https://doi.org/10.1038/s41378-024-00701-9, pp. 1-12.*
(Continued)

*Primary Examiner* — Andrew R Dyer
(74) *Attorney, Agent, or Firm* — Christopher G. Darrow; Darrow Mustafa PC

(57) ABSTRACT

A system for controlling sensor fusion can include a processor and a memory. The memory can store a sensor data adjustment module, a sensor fusion module, and a communications module. The sensor data adjustment module can include instructions that, when executed by the processor, cause the processor to: (1) calculate reliability scores for sensors and (2) multiply values of data, produced by the sensors, by the reliability scores to produce a scored input value. The sensor fusion module can include instructions that, when executed by the processor, cause the processor to cause the scored input value to be processed by a reservoir computing network in a manner that realizes the sensor fusion. The communications module can include instructions that, when executed by the processor, cause one or more readout values, based on the sensor fusion, to be communicated to an automated vehicle technology system to control movement of a vehicle.

20 Claims, 5 Drawing Sheets

(51) Int. Cl.
*B60W 50/029* (2012.01)
*B60W 50/14* (2020.01)
*G06N 3/0442* (2023.01)

(52) U.S. Cl.
CPC ........... *B60W 50/14* (2013.01); *G06N 3/0442* (2023.01); *B60W 2050/0292* (2013.01); *B60W 2556/20* (2020.02); *B60W 2556/25* (2020.02); *B60W 2556/35* (2020.02)

(58) Field of Classification Search
CPC ......... B60W 2556/20; B60W 2556/25; B60W 2556/35; G06N 3/0442
USPC ............................................................ 701/23
See application file for complete search history.

(56) References Cited

U.S. PATENT DOCUMENTS

| | | | | |
|---|---|---|---|---|
| 2020/0184236 | A1* | 6/2020 | Aguiar | G05D 1/0088 |
| 2020/0249543 | A1* | 8/2020 | Bienstman | G02F 3/028 |
| 2021/0264242 | A1 | 8/2021 | Canaday et al. | |
| 2021/0406560 | A1 | 12/2021 | Park et al. | |
| 2022/0297706 | A1* | 9/2022 | Nilsson | G06V 10/80 |
| 2023/0176557 | A1* | 6/2023 | Cella | G05B 13/048 700/117 |
| 2024/0153531 | A1* | 5/2024 | Park | G06N 3/0464 |
| 2024/0378875 | A1* | 11/2024 | Sajjan | G06V 20/58 |
| 2025/0162618 | A1* | 5/2025 | Ouyang | B60W 60/0027 |

OTHER PUBLICATIONS

Spectral radius, Dec. 10, 2023, medium.com, pp. 1-5.*

López-Ortiz et al., Energy-Efficient Edge and Cloud Image Classification with Multi-reservoir Echo State Network and Data Processing Units, Jun. 4, 2024, Sensors 2024, 24, 3640, pp. 1-20.*

Yeong et al., "Sensor and Sensor Fusion Technology in Autonomous Vehicles: A Review," Sensors, vol. 21, Feb. 19, 2023, pp. 2140-2176.

Antonik et al., "FPGA Implementation of Reservoir Computing with Online Learning," Jun. 19, 2015, pp. 1-8.

Eshratifar et al., "JointDNN: An Efficient Training and Inference Engine for Intelligent Mobile Cloud Computing Services," IEEE Transactions on Mobile Computing, vol. 20, No. 2, Feb. 1, 2012, pp. 565-576.

Schrauwen et al., "An overview of reservoir computing: theory, applications and implementations," Proceedings of the 15th european symposium on artificial neural networks. 12 pages.

Liu et al., "When Deep Learning Meets Steganography: Protecting Inference Privacy in the Dark," Intelligent Computing, vol. 2, Sep. 26, 2023, pp. 590-599.

Liu et al. "In-Sensor Visual Perception and Inference," Intelligent Computing, vol. 2, Sep. 26, 2023, pp. 1-16.

Jin et al., "A High Efficient Next Generation Reservoir Computing to Predict and Generate Chaos with Application for Secure Communication," IET Communications, vol. 17, No. 4, Mar. 2023, pp. 489-496.

Yan et al., "Emerging Opportunities and Challenges for the Future of Reservoir Computing," Nature Communications, vol. 15, Apr. 15, 2024, pp. 1-18.

Ken-Ichi Kitayama, "Guiding Principle of Reservoir Computing Based on 'Small-World' Network," Scientific Reports, vol. 12, Oct. 6, 2022, pp. 16697-16706.

Wu et al., "Nonmasking-Based Reservoir Computing with a Single Dynamic Memristor for Image Recognition," Nonlinear Dynamics, vol. 112, No. 1, Mar. 2024, pp. 1-16.

Jalalvand et al., "Real-Time and Adaptive Reservoir Computing with an Application to Profile Prediction in Fusion Plasma," IEEE Transactions on Neural Networks and Learning Systems, vol. 33, No. 6, Jun. 2022, pp. 2630-2641.

Yang et al., "Semiconductor Optical Amplifier (SOA)-Driven Reservoir Computing for Dense Wavelength-Division Multiplexing (DWDM) Signal Compensation," Sensors, vol. 23, No. 12, Apr. 25, 2023, pp. 5697-5709.

Unknown, "Data fusion," last accessed on Nov. 13, 2024, 7 pages, found at https://en.wikipedia.org/wiki/Data_fusion.

Unknown, "Sensor fusion," last accessed on Nov. 13, 2024, 8 pages, found at https://en.wikipedia.org/wiki/Sensor_fusion.

Unknown, "Reservoir computing," last accessed on Nov. 13, 2024, 8 pages, found at https://en.wikipedia.org/wiki/Reservoir_computing.

Liu et al., "When Deep Learning Meets Steganography: Protecting Inference Privacy in the Dark," IEEE Conference on Computer Communications, May 2, 2022, pp. 590-599.

Gauthier et al., "Next generation reservoir computing," Nature Communications, Sep. 2021, pp. 1-8.

* cited by examiner

CONTROLLING SENSOR FUSION FOR AUTOMATED VEHICLE TECHNOLOGY

TECHNICAL FIELD

The disclosed technologies are directed to controlling sensor fusion for automated vehicle technology.

BACKGROUND

Operation of a vehicle can be controlled by a human being. However, automation of control of some operations of a vehicle can reduce problems caused by miscalculations made when operation of the vehicle is controlled by a human being. Such problems can include, for example, collisions, traffic congestion, increased harm to an ecosystem in an environment of the vehicle, suboptimal performance of operations of the vehicle, or the like. An ability to allow some operations of a vehicle to be automated can depend upon an ability of the vehicle to perceive objects in the environment of the vehicle. Technology developed to enable a vehicle to perceive objects in the environment of the vehicle can be referred to as perception systems. A perception system can depend upon data produced by sensors disposed on the vehicle. Such sensors can include, for example, one or more imaging devices or ranging devices. Imaging devices can include, for example, a camera, a color camera, a stereoscopic camera, a video camera, a digital video camera, or the like. Ranging devices can include, for example, ultrasonic imaging devices, infrared imaging devices, radar devices, lidar devices, ultrasonic ranging devices, infrared ranging devices, or the like. A performance of a perception system can be improved by sensor fusion. Sensor fusion can be a process of combining data from different sensors in a manner that reduces a degree of uncertainty about an identification of an object in the environment, a location of the object, or both.

SUMMARY

In an embodiment, a system for controlling sensor fusion can include a processor and a memory. The memory can store a sensor data adjustment module, a sensor fusion module, and a communications module. The sensor data adjustment module can include instructions that, when executed by the processor, cause the processor to: (1) calculate reliability scores for sensors and (2) multiply values of data, produced by the sensors, by the reliability scores to produce a scored input value. The sensor fusion module can include instructions that, when executed by the processor, cause the processor to cause the scored input value to be processed by a reservoir computing network in a manner that realizes the sensor fusion. The communications module can include instructions that, when executed by the processor, cause one or more readout values, based on the sensor fusion, to be communicated to an automated vehicle technology system to control a movement of a vehicle.

In another embodiment, a method for controlling sensor fusion can include calculating, by a processor, reliability scores for sensors. The method can include multiplying, by the processor, values of data, produced by the sensors, by the reliability scores to produce a scored input value. The method can include causing, by the processor, the scored input value to be processed by a reservoir computing network in a manner that realizes the sensor fusion. The method can include causing, by the processor, one or more readout values, based on the sensor fusion, to be communicated to an automated vehicle technology system to control a movement of a vehicle.

In another embodiment, a non-transitory computer-readable medium for controlling sensor fusion can include instructions that, when executed by one or more processors, cause the one or more processors to calculate reliability scores for sensors. The non-transitory computer-readable medium can include instructions that, when executed by one or more processors, cause the one or more processors to multiply values of data, produced by the sensors, by the reliability scores to produce a scored input value. The non-transitory computer-readable medium can include instructions that, when executed by one or more processors, cause the one or more processors to cause the scored input value to be processed by a reservoir computing network in a manner that realizes the sensor fusion. The non-transitory computer-readable medium can include instructions that, when executed by one or more processors, cause the one or more processors to cause one or more readout values, based on the sensor fusion, to be communicated to an automated vehicle technology system to control a movement of a vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
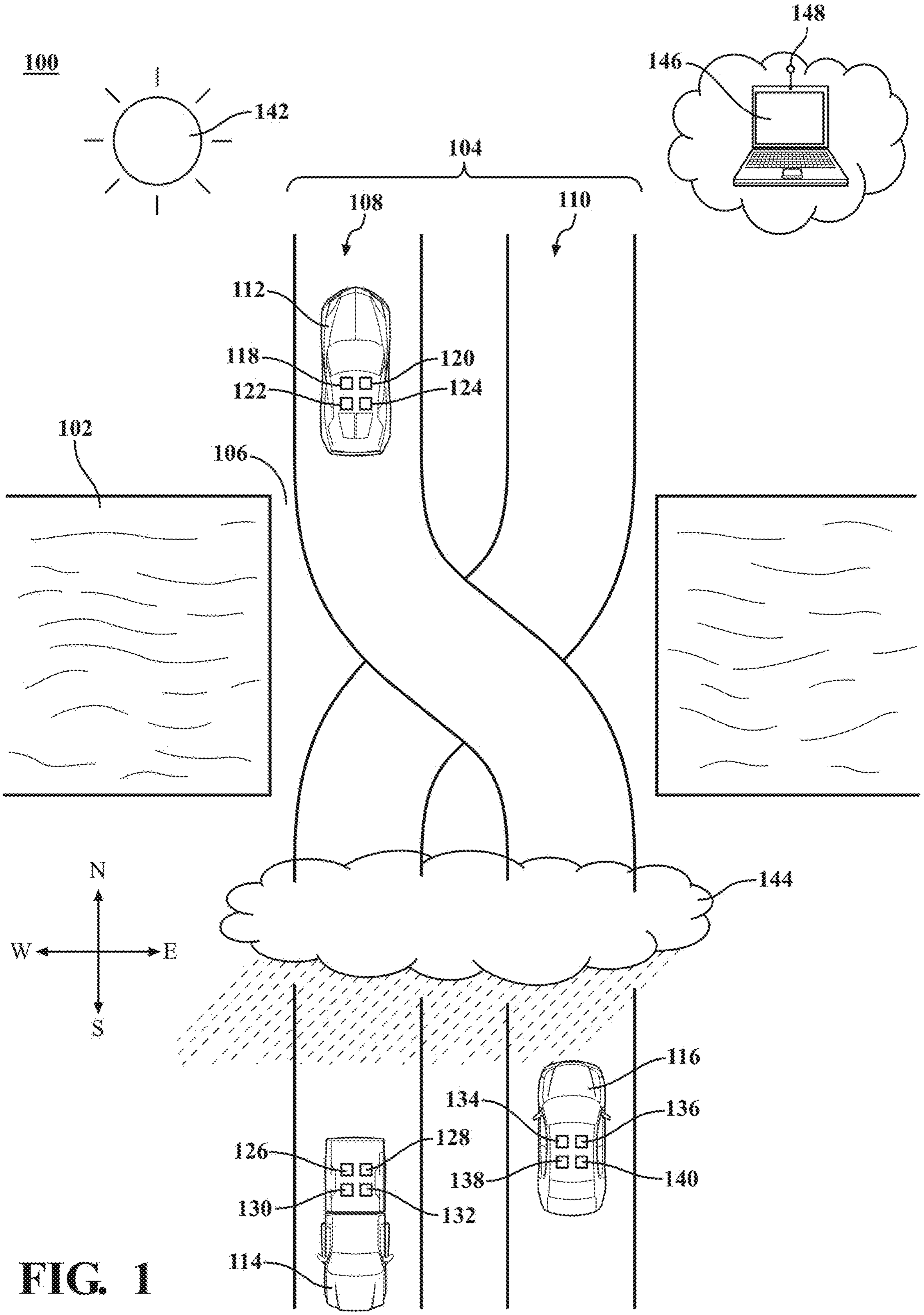
FIG. 1 includes a diagram that illustrates an example of an environment for controlling sensor fusion for automated vehicle technology, according to the disclosed technologies.

The disclosed technologies are directed to controlling sensor fusion for automated vehicle technology. Data, produced by sensors, can be obtained. For example, the sensors can include one or more imaging devices or ranging devices. For example, the imaging devices can include a camera, a color camera, a stereoscopic camera, a video camera, a digital video camera, or the like. For example, the ranging devices can include ultrasonic imaging devices, infrared imaging devices, radar devices, lidar devices, ultrasonic ranging devices, infrared ranging devices, or the like. For example, a reliability of data produced by a sensor can change due to a change in a performance of the sensor, a change in an environment of the sensor, or the like. Reliability scores for the sensors can be calculated. For example, a reliability score can include a function of one or more of: (1) a measure of a noise associated with a corresponding sensor, (2) a measure of a latency associated with the data produced by the corresponding sensor, or (3) a measure of a cross-verification of the data produced by the corresponding sensor with data produced by another source. The data, produced by the sensors, can be multiplied by the reliability scores to produce a scored input value. Thus, with this approach, sensor fusion of the data produced by the sensors can be performed in a manner that accounts for the reliability of the data.

Because artificial neural networks (ANNs) can be configured to learn complex relationships, operate on multimodal data, merge data from different sources, and separate combined data into different types of information, ANNs can be useful for performing sensor fusion. Because vehicles can be configured to operate over long durations of time and in different environments, an ANN configured to perform sensor fusion for sensors disposed on a vehicle may need to be retrained from time to time to account for changes in performances of the sensors, changes in an environment of the vehicle, or the like. A reservoir computing network is a type of ANN that can be trained more easily than other types of ANNs. For example, a reservoir computing network can include an input layer, a reservoir layer, and an output layer. For example, the input layer can be configured to receive input values and to multiply the input values by fixed input weights to produce reservoir inputs. For example, the reservoir layer can be configured to receive the reservoir inputs and to use fixed reservoir weights to perform one or more nonlinear operations on the reservoir inputs to produce reservoir outputs. For example, the output layer can be configured to receive the reservoir outputs and to multiply the reservoir outputs by trained output weights to produce readout values. Because a reservoir computing network uses trained output weights, but fixed input weights and fixed reservoir weights, retraining the reservoir computing network only requires retraining the trained output weights and therefore can be retrained more easily (e.g., with fewer computations) than other types of ANNs, which can require use of backpropagation to be retrained. Thus, with this approach, the scored input value, produced by the disclosed technologies, can be processed by a reservoir computing network in a manner that realizes the sensor fusion. One or more readout values, based on the sensor fusion, can be communicated to an automated vehicle technology system to control a movement of the vehicle. For example, the automated vehicle technology system can include an advanced driver-assistance system (ADAS).

FIG. 1 includes a diagram that illustrates an example of an environment 100 for controlling sensor fusion for automated vehicle technology, according to the disclosed technologies. For example, the environment 100 can include a river 102 disposed along a line of latitude and a road 104 disposed along a line of longitude. For example, a bridge 106 can traverse the river 102 and the road 104 can be disposed on the bridge 106. For example, the road 104 can have a first lane 108 for northbound traffic and a second lane 110 for southbound traffic. For example, in the environment 100, a regime north of the river 102 can be a left-hand traffic regime and a regime south of the river 102 can be a right-hand traffic regime. For example, the bridge 106 can be configured so that the first lane 108 passes over (or under) the second lane 110 so that: (1) north of the river 102, the first lane 108 can be west of the second lane 110 and (2) south of the river 102, the first lane 108 can be east of the second lane 110.

For example, the environment 100 can include a first vehicle 112, a second vehicle 114, and a third vehicle 116. For example, the first vehicle 112 can be located in the first lane 108 north of the river 102, the second vehicle 114 can be located in the second lane 110 south of the river 102, and the third vehicle 116 can be located in the first lane 108 south of the river 102. For example, the first vehicle 112 can include a first sensor 118, a second sensor 120, a communications device 122, and a system 124 for controlling sensor fusion. For example, the second vehicle 114 can include a first sensor 126, a second sensor 128, a communications device 130, and a system 132 for controlling sensor fusion. For example, the third vehicle 116 can include a first sensor 134, a second sensor 136, a communications device 138, and a system 140 for controlling sensor fusion. For example, the first vehicle 112 can be a sports car, the second vehicle 114 can be a pickup truck, and the third vehicle 116 can be a sedan.

For example, the first vehicle 112 can be located within an area of sunshine 142 located north of the river 102, but the second vehicle 114 and the third vehicle 116 can be located within an area of rainfall 144 located south of the river 102.

For example, the environment 100 can include a cloud computing platform 146. For example, the cloud computing platform 146 can include a communications device 148.

Figure 2:
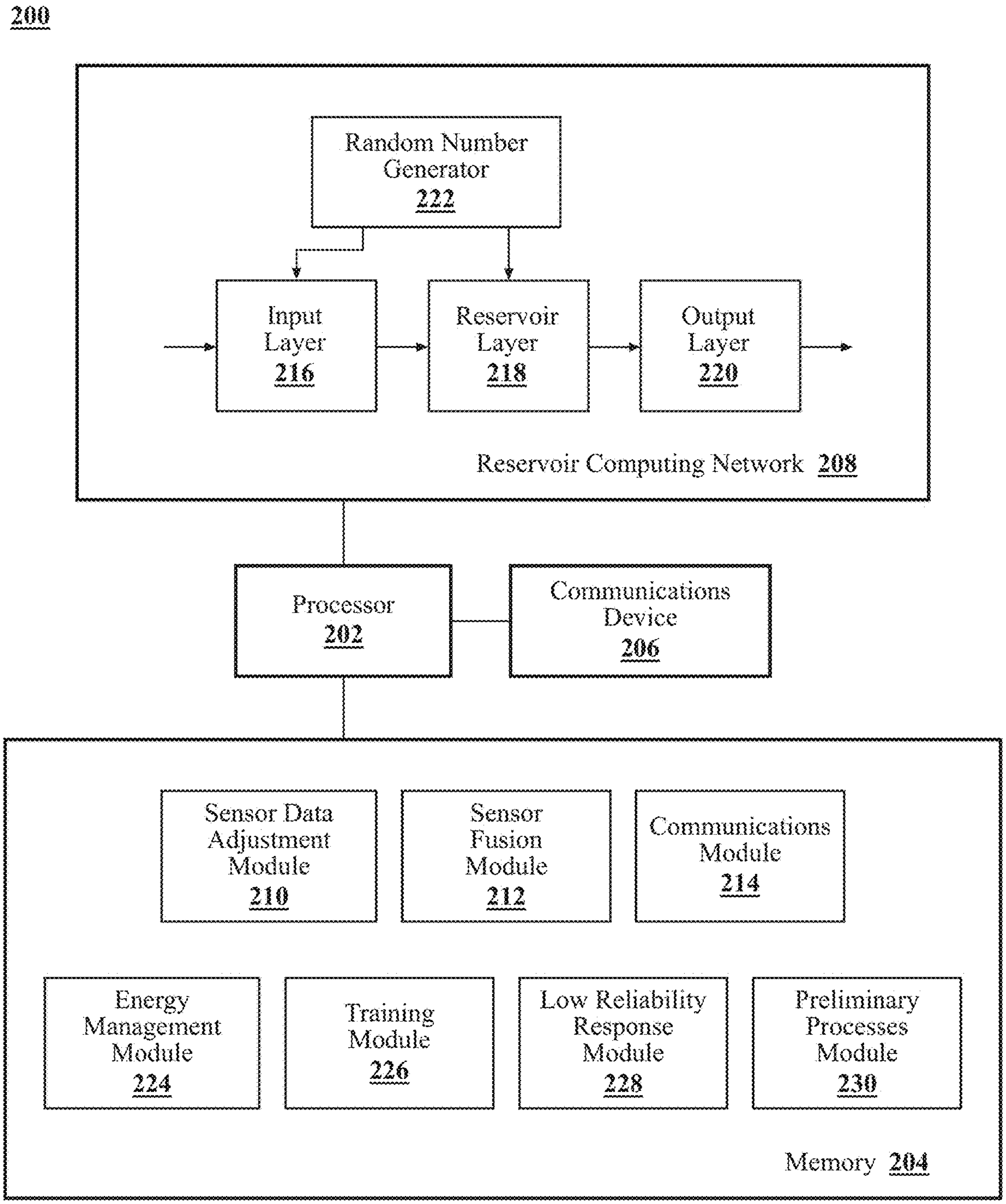
FIG. 2 includes a block diagram that illustrates an example of a system for controlling sensor fusion, according to the disclosed technologies.

FIG. 2 includes a block diagram that illustrates an example of a system 200 for controlling sensor fusion, according to the disclosed technologies. The system 200 can include, for example, a processor 202, a memory 204, a communications device 206, and a reservoir computing network 208. The memory 204 can be communicably coupled to the processor 202. The communications device 206 can be communicably coupled to the processor 202. The reservoir computing network 208 can be communicably coupled to the processor 202. For example, the memory 204 can store a sensor data adjustment module 210, a sensor fusion module 212, and a communications module 214. For example, any of the system 124 (illustrated in FIG. 1), the system 132 (illustrated in FIG. 1), or the system 140 (illustrated in FIG. 1) can be the system 200.

For example, the sensor data adjustment module 210 can include instructions that function to control the processor 202 to: (1) calculate reliability scores for sensors and (2) multiply values of data, produced by the sensors, by the reliability scores to produce a scored input value. For example, one or more of the sensors can include one or more of an imaging device or a ranging device. For example, one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, or an infrared ranging device. For example, the instructions to calculate the reliability scores can include instructions to calculate, continuously and in real time, the reliability scores.

For example, a reliability score can be based on a measure of a performance of a corresponding sensor with respect to a baseline measure of the performance. For example, a deviation from the baseline measure can be indicative of anomalies or inconsistencies due to sensor degradation or external interference. For example, the sensor data adjustment module 210 can further include instructions to cause the baseline measure of the performance to be recalibrated. For example, the baseline measure of the performance may need to be recalibrated from time to time based on data collected over a long duration of time or to account for sensor aging or environmental changes.

For example, a reliability score can include a function of one or more of: (1) a measure of a noise associated with a corresponding sensor, (2) a measure of a latency associated with the data produced by the corresponding sensor, or (3) a measure of a cross-verification of the data produced by the corresponding sensor with data produced by another source. For example, the sensor data adjustment module 210 can further include instructions to: (1) calculate the measure of the noise, (2) calculate the measure of the latency, or (3) calculate the measure of the cross-verification. For example, the measure of the noise can include a measure of the data produced by the corresponding sensor over a moving window of time. For example, the measure of the data can include one or more of a variance of the data or a standard deviation of the data. For example, the measure of the latency can include a measure of a duration of time of the corresponding sensor to respond to a physical condition expected to be detected by the corresponding sensor. For example, the other source (associated with the measure of the cross-verification) can include one or more of another sensor or a model that produces a prediction. For example, the function can include a sum of two or more of a first product, a second product, or a third product. For example, the first product can be a product of a first weight multiplied by a normalized measure of the noise. For example, the second product can be a product of a second weight multiplied by a normalized measure of the latency. For example, the third product can be of a third weight multiplied by the measure of the cross-verification. For example: (1) the normalized measure of the noise can have a value of from zero to one and (2) the normalized measure of the latency can have a value of from zero to one. For example: (1) a value of zero can be associated with a high degree of unreliability and (2) a value of one can be associated with a high degree of reliability.

For example, the sensor fusion module 212 can include instructions that function to control the processor 202 to cause the scored input value to be processed by the reservoir computing network 208 in a manner that realizes the sensor fusion.

For example, the reservoir computing network 208 can include an input layer 216, a reservoir layer 218, and an output layer 220. For example, the input layer 216 can be configured to receive the scored input value and to multiply the scored input value by a fixed input weight to produce a reservoir input. For example, the reservoir layer 218 can be configured to receive the reservoir input and to perform one or more nonlinear operations on the reservoir input to realize the sensor fusion to produce a reservoir output. For example, the reservoir layer 218 can be configured as a recurrent neural network (RNN). For example, the output layer 220 can be configured to receive the reservoir output and to multiply the reservoir output by one or more trained output weights to produce one or more readout values.

For example, the reservoir computing network 208 can further include a random number generator 222. For example, the random number generator 222 can be configured to produce the fixed input weight and one or more fixed reservoir weights. For example, the input layer 216 can be further configured to receive the fixed input weight. For example, the reservoir layer is 218 can be further configured to receive the one or more fixed reservoir weights and to use the one or more fixed reservoir weights to perform the one or more nonlinear operations.

For example, the reservoir computing network 208 can include a physical reservoir computing network. A physical reservoir computing network can be implemented using hardware. For example, a physical reservoir computing network can consume less power and can be more efficient than a virtual reservoir computing network, which can be implemented using software.

For example, the reservoir layer 218 of the physical reservoir computing network can include one or more of: (1) a Boolean logic circuit implemented as a field-programmable gate array (FPGA), (2) a Boolean logic circuit implemented as an application-specific integrated circuit (ASIC), (3) an electrical reservoir scheme represented by a memristor device, (4) an electrical reservoir scheme represented by a spintronic device, (5) a photonic reservoir scheme, (6) a mechanical reservoir scheme, (7) a biological reservoir scheme, (8) a quantum system-based reservoir scheme, (9) a superconductor-based reservoir scheme, or (10) the like.

For example: (1) the reservoir layer 218 of the physical reservoir computing network can include a Boolean logic circuit implemented as a FPGA and (2) the memory 204 can further store an energy management module 224. For example, the energy management module 224 can include instructions that function to control the processor 202 to control the FPGA to deactivate a portion of the FPGA in response to a determination of one or more of: (1) a lack of a need for the portion of the FPGA for an operation associated with the sensor fusion or (2) an existence of a situation in which information, included in the one or more readout values, having a reduced degree of precision is acceptable to control a movement of a vehicle. For example, if there is a lack of a need for the portion of the FPGA for an operation associated with the sensor fusion, then the portion of the FPGA can be deactivated to reduce power consumption by the reservoir layer 218. For example, the vehicle being in an idle state, rather than an active driving state, can be a situation in which information, included in the one or more readout values, having a reduced degree of precision is acceptable to control the movement of the vehicle.

For example, the memory 204 can further store a training module 226. For example, the training module 226 can include instructions that function to control the processor 202 to cause the output layer 220 to be trained so that the one or more trained output weights are set so that the one or more readout values are within a threshold of one or more desired readout values. For example, the output layer 220 can be trained using linear regression. Thus, with this approach, the reservoir computing network 208 can easily be trained and retrained to account for changes in performances of the sensors, changes in an environment of the vehicle, or the like.

For example, the communications module 214 can include instructions that function to control the processor 202 to cause the one or more readout values, based on the sensor fusion, to be communicated to an automated vehicle technology system to control the movement of the vehicle. For example, the one or more readout values can include one or more of a first readout value, a second readout value, or a third readout value. For example, the first readout value can include information useful for an operation, performed by the automated vehicle technology system, based on features extracted from the data produced by the sensors. For example, the second readout value can include information useful for a motion prediction operation performed by the automated vehicle technology system. For example, the third readout value can include information useful for a path planning operation performed by the automated vehicle technology system. For example, the path planning operation can include a long short-term memory (LSTM) neural network-based path planning operation. For example, the automated vehicle technology system can include one or more advanced driver-assistance systems (ADAS).

For example, the memory 204 can further store a low reliability response module 228. For example, the low reliability response module 228 can include instructions that function to control the processor 202 to: (1) determine that a reliability score is below a threshold value and (2) one or more of: (a) cause an influence of data produced by a corresponding sensor on information included in the one or more readout signals to be reduced or (b) cause a switch to a fallback mode that prioritizes more reliable sensors. Additionally or alternatively, for example, the low reliability response module 228 can include instructions that function to control the processor 202 to: (1) determine that a reliability score is below a first threshold value, (2) continuously monitor the reliability score with respect to a second threshold value, and (3) in response to a determination that the reliability score is less than the second threshold value, one or more of: (a) cause an alert to be triggered or (b) cause a switch to a failsafe mode.

For example, the memory 204 can further store a preliminary processes module 230. For example, the preliminary processes module 230 can include instructions that function to control the processor 202 to: (1) cause the data produced by each of the sensors to be converted into corresponding temporal signals, (2) cause the corresponding temporal signals to be aligned, (3) cause a size, of the reservoir layer 218 of the reservoir computing network 208, to be initialized to determine a count of a number of neurons to be used by the reservoir layer 218, and (4) cause a spectral radius to be selected to determine a maximum absolute value of a fixed reservoir weight used by the reservoir layer 218.

Additionally, for example, the preliminary processes module 230 can further include instructions to: (1) cause each of the corresponding temporal signals to be filtered to extract local features to be included in a corresponding set of feature maps and (2) cause an operation to be performed on each of the corresponding set of feature maps to produce a pooled set of feature maps. For example, the instructions to cause each of the corresponding temporal signals to be filtered can include instructions to cause a convolution around an item of data in a temporal signal of each of the corresponding temporal signals. For example, the instructions to cause the convolution can include instructions to cause an elementwise multiplication to be performed. For example, the pooled set of feature maps can reduce a spatial size of an input to the reservoir computing network 208, which can reduce a number of parameters and computations to be performed by the reservoir computing network 208, which can control overfitting.

Additionally, for example, the communications module 214 can further include instructions to cause the data, produced by the sensors, to be communicated to a cloud computing platform. With reference to FIGS. 1 and 2, for example, if: (1) the system 140, included in the third vehicle 116, is the system 200, (2) the communications device 138 is the communications device 206, and (3) the cloud computing platform 146 is the cloud computing platform, then the data, produced by the first sensor 134 and the second sensor 136, can be caused to be communicated, via the communications device 138, to the cloud computing platform 146, via the communications device 148.

For example, the cloud computing platform (e.g., the cloud computing platform 146) can be configured to operate a cloud-based reservoir computing network. For example, the cloud-based reservoir computing network can include a virtual reservoir computing network. A virtual reservoir computing network can be implemented using software. For example, a virtual reservoir computing network can be easier to reconfigure than a physical reservoir computing network, which can be implemented using hardware.

For example, the cloud-based reservoir computing network can be configured to: (1) receive: (a) the data produced by the sensors (e.g., the first sensor 134 and the second sensor 136 (via the communications device 138 and the communications device 148)) and (b) other data produced by other sensors of other vehicles (e.g., the first sensor 118 and the second sensor 120 (via the communications device 122 and the communications device 148) and the first sensor 126 and the second sensor 128 (via the communications device 130 and the communications device 148)) and (2) process the data and the other data in the manner that realizes the sensor fusion to produce one or more cloud-based reservoir computing network readout values. For example, the one or more cloud-based reservoir computing network readout values can include one or more of a first readout value, a second readout value, a third readout value, or a fourth readout value. For example, the first readout value can include information useful for testing the reservoir computing network 208 for temporal validation. For example, the second readout value can include information useful for testing a characteristic of a sensor (e.g., the first sensor 134 or the second sensor 136) for a change in the characteristic due to an aging of the sensor (e.g., the first sensor 134 or the second sensor 136). For example, the third readout value can include information useful for augmenting the data produced by the sensors (e.g., the first sensor 134 and the second sensor 136) with the other data produced by the other sensors (e.g., the first sensor 118, the second sensor 120, the first sensor 126, and the second sensor 128) of the other vehicles (e.g., the first vehicle 112 and the second vehicle 114). For example, the fourth readout value can include information useful for training multiple models of reservoir layers.

For example, the cloud computing platform (e.g., the cloud computing platform 146) can be configured to train, using the fourth readout value, the multiple models of reservoir layers. For example, a model, of the multiple models of reservoir layers, can: (1) have one or more of a corresponding set of parameters or a corresponding starting point and (2) be associated with a corresponding characteristic that distinguishes the model from other models of the multiple models of reservoir layers. For example: (1) one model, of the multiple models of reservoir layers, can be configured to produce one or more readout values for an automated vehicle technology system associated with a sports car, (2) another model, of the multiple models of reservoir layers, can be configured to produce one or more readout values for an automated vehicle technology system associated with a pickup truck, and (3) yet another model, of the multiple models of reservoir layers, can be configured to produce one or more readout values for an automated vehicle technology system associated with a sedan. Alternatively or additionally, for example: (1) one model, of the multiple models of reservoir layers, can be configured to produce one or more readout values useful for a vehicle operating in an area of rainfall (e.g., in which a measure of a performance of a lidar device may be less than when the lidar device is operating in an area of sunshine) and (2)

another model, of the multiple models of reservoir layers, can be configured to produce one or more readout values useful for a vehicle operating in darkness (e.g., in which a measure of a performance of an imaging device may be less than when the imaging device is operating in an area of sunshine). Alternatively or additionally, for example: (1) one model, of the multiple models of reservoir layers, can be configured to produce one or more readout values useful for a vehicle operating in a left-hand traffic regime and (2) another model, of the multiple models of reservoir layers, can be configured to produce one or more readout values useful for a vehicle operating in a right-hand traffic regime.

For example, the cloud computing platform (e.g., the cloud computing platform 146) can be configured to cause one or more of the multiple models of reservoir layers to produce one or more fifth readout values. For example, the one or more fifth readout values can include information useful for modifying an operation of the reservoir computing network 208.

For example, the cloud computing platform (e.g., the cloud computing platform 146) can be configured to cause one or more of the first readout value, the second readout value, the third readout value, or the one or more fifth readout values to be communicated (e.g., via the communications device 148) to one or more of the vehicle (e.g., the third vehicle 116 (via the communications device 138)) or one or more of the other vehicles (e.g., the first vehicle 112 (via the communications device 122) or the second vehicle 114 (via the communications device 130)).

Returning to FIG. 2, additionally, for example, the communications module 214 can further include instructions to cause the system 200 to receive the first readout value from the cloud computing platform. With reference to FIGS. 1 and 2, for example, if: (1) the system 140, included in the third vehicle 116, is the system 200, (2) the communications device 138 is the communications device 206, and (3) the cloud computing platform 146 is the cloud computing platform, then the first readout value from the cloud computing platform 146 can be received by the system 140 via the communications device 138. For example, the first readout value from the cloud computing platform can be useful for causing the reservoir computing network 208 to be retrained in response to a determination that a measure of a performance of the reservoir computing network 208 with respect to temporal validation is outside of an acceptable range of measures of the performance.

Returning to FIG. 2, additionally, for example, the communications module 214 can further include instructions to cause the system 200 to receive the second readout value from the cloud computing platform. With reference to FIGS. 1 and 2, for example, if: (1) the system 140, included in the third vehicle 116, is the system 200, (2) the communications device 138 is the communications device 206, and (3) the cloud computing platform 146 is the cloud computing platform, then the second readout value from the cloud computing platform 146 can be received by the system 140 via the communications device 138. For example, the second readout value from the cloud computing platform can be useful for causing the reservoir computing network 208 to be retrained in response to a determination that the change in the characteristic due to the aging of the sensor affects a performance of the reservoir computing network 208.

Returning to FIG. 2, additionally, for example, the communications module 214 can further include instructions to cause the system 200 to receive the third readout value from the cloud computing platform. With reference to FIGS. 1 and 2, for example, if: (1) the system 140, included in the third vehicle 116, is the system 200, (2) the communications device 138 is the communications device 206, and (3) the cloud computing platform 146 is the cloud computing platform, then the third readout value from the cloud computing platform 146 can be received by the system 140 via the communications device 138. For example, because the third readout value includes information useful for augmenting the data produced by the sensors (e.g., the first sensor 134 and the second sensor 136) with the other data produced by the other sensors (e.g., the first sensor 118, the second sensor 120, the first sensor 126, and the second sensor 128), the information included in the third readout value from the cloud computing platform can improve a performance of the reservoir computing network 208.

Returning to FIG. 2, additionally, for example, the communications module 214 can further include instructions to cause the system 200 to receive the one or more fifth readout values from the cloud computing platform. With reference to FIGS. 1 and 2, for example, if: (1) the system 140, included in the third vehicle 116, is the system 200, (2) the communications device 138 is the communications device 206, and (3) the cloud computing platform 146 is the cloud computing platform, then the one or more fifth readout values from the cloud computing platform 146 can be received by the system 140 via the communications device 138. For example, the information included in the one or more fifth readout values from the cloud computing platform 146 can be useful for modifying an operation of the reservoir computing network 208. For example, the information included in the one or more fifth readout values from the cloud computing platform 146 can change one or more of: (1) a size, of the reservoir layer 218 of the reservoir computing network 208 or (2) a spectral radius of a fixed reservoir weight used by the reservoir layer 218.

Figure 3A:
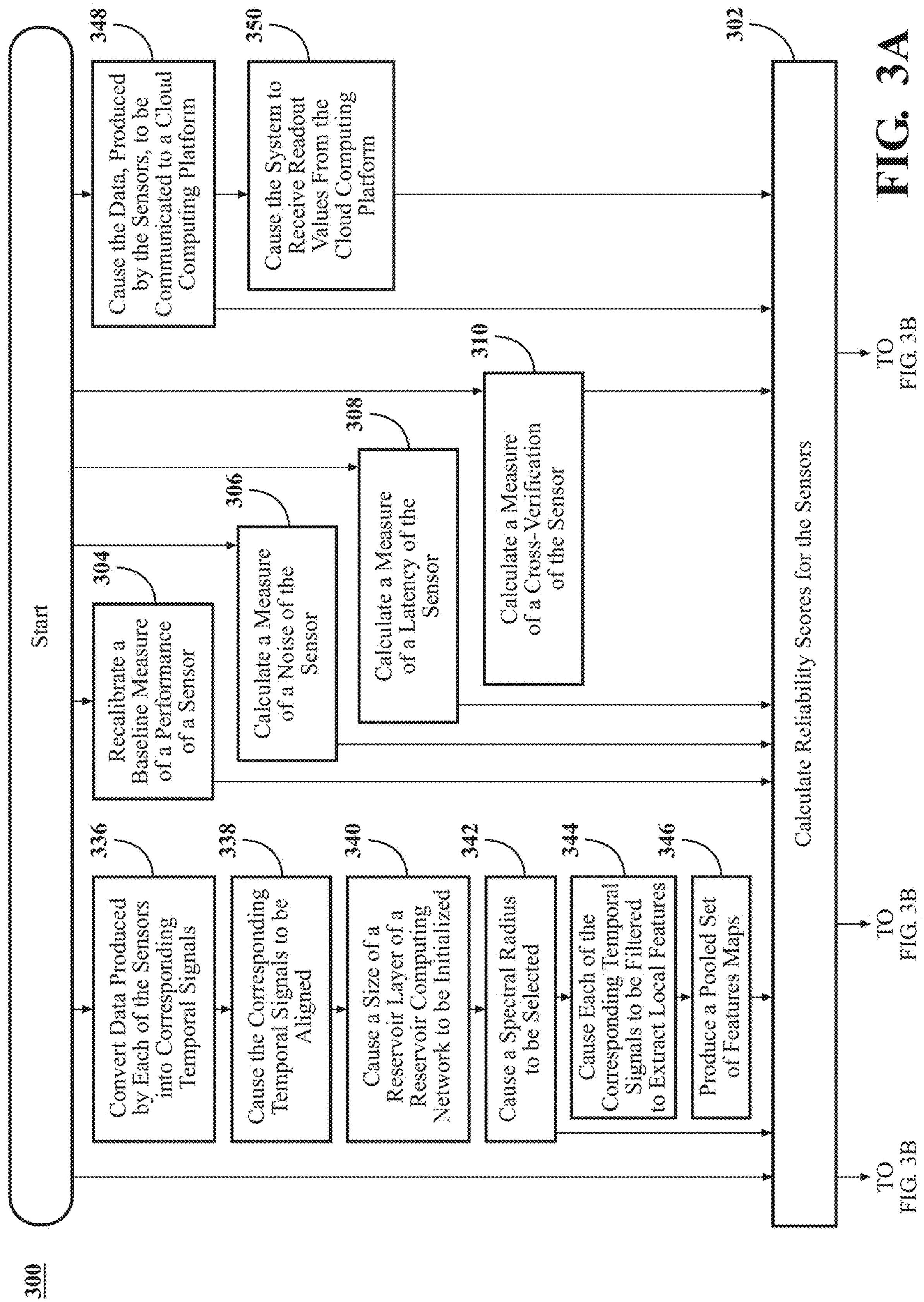
FIGS. 3A and 3B include a flow diagram that illustrates an example of a method that is associated with controlling sensor fusion, according to the disclosed technologies.
Figure 3B:
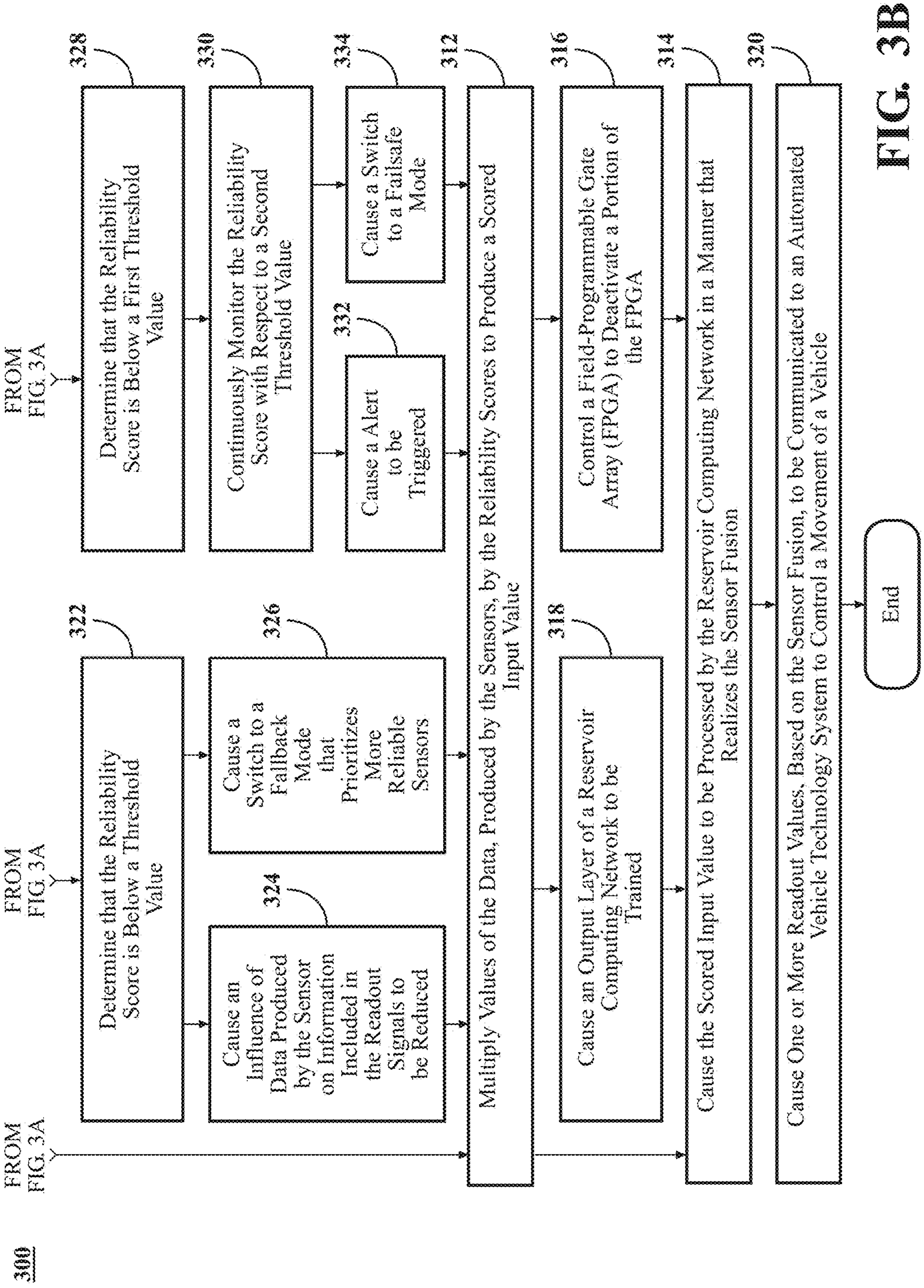

FIGS. 3A and 3B include a flow diagram that illustrates an example of a method 300 that is associated with controlling sensor fusion, according to the disclosed technologies. Although the method 300 is described in combination with the system 200 illustrated in FIG. 2, one of skill in the art understands, in light of the description herein, that the method 300 is not limited to being implemented by the system 200 illustrated in FIG. 2. Rather, the system 200 illustrated in FIG. 2 is an example of a system that may be used to implement the method 300. Additionally, although the method 300 is illustrated as a generally serial process, various aspects of the method 300 may be able to be executed in parallel.

In FIG. 3A, in the method 300, at an operation 302, for example, the sensor data adjustment module 210 can calculate reliability scores for sensors. For example, one or more of the sensors can include one or more of an imaging device or a ranging device. For example, one or more of the imaging device or the ranging device can include one or more of a camera, a color camera, a stereoscopic camera, a video camera, a digital video camera, an ultrasonic imaging device, an infrared imaging device, a radar device, a lidar device, an ultrasonic ranging device, or an infrared ranging device. For example, the instructions to calculate the reliability scores can include instructions to calculate, continuously and in real time, the reliability scores.

For example, a reliability score can be based on a measure of a performance of a corresponding sensor with respect to a baseline measure of the performance. For example, a deviation from the baseline measure can be indicative of anomalies or inconsistencies due to sensor degradation or external interference. For example, additionally, at an operation 304, the sensor data adjustment module 210 can cause the baseline measure of the performance to be recalibrated. For example, the baseline measure of the performance may need to be recalibrated from time to time based on data collected over a long duration of time or to account for sensor aging or environmental changes.

For example, a reliability score can include a function of one or more of: (1) a measure of a noise associated with a corresponding sensor, (2) a measure of a latency associated with the data produced by the corresponding sensor, or (3) a measure of a cross-verification of the data produced by the corresponding sensor with data produced by another source. For example, additionally, at an operation 306, the sensor data adjustment module 210 can calculate the measure of the noise. For example, additionally, at an operation 308, the sensor data adjustment module 210 can calculate the measure of the latency. For example, additionally, at an operation 310, the sensor data adjustment module 210 can calculate the measure of the cross-verification. For example, the measure of the noise can include a measure of the data produced by the corresponding sensor over a moving window of time. For example, the measure of the data can include one or more of a variance of the data or a standard deviation of the data. For example, the measure of the latency can include a measure of a duration of time of the corresponding sensor to respond to a physical condition expected to be detected by the corresponding sensor. For example, the other source (associated with the measure of the cross-verification) can include one or more of another sensor or a model that produces a prediction. For example, the function can include a sum of two or more of a first product, a second product, or a third product. For example, the first product can be a product of a first weight multiplied by a normalized measure of the noise. For example, the second product can be a product of a second weight multiplied by a normalized measure of the latency. For example, the third product can be of a third weight multiplied by the measure of the cross-verification. For example: (1) the normalized measure of the noise can have a value of from zero to one and (2) the normalized measure of the latency can have a value of from zero to one. For example: (1) a value of zero can be associated with a high degree of unreliability and (2) a value of one can be associated with a high degree of reliability.

In FIG. 3B, in the method 300, for example, at an operation 312, the sensor data adjustment module 210 can multiply values of data, produced by the sensors, by the reliability scores to produce a scored input value.

For example, at an operation 314, the sensor data adjustment module 210 can cause the scored input value to be processed by the reservoir computing network 208 in a manner that realizes the sensor fusion.

For example, the reservoir computing network 208 can include an input layer 216, a reservoir layer 218, and an output layer 220. For example, the input layer 216 can be configured to receive the scored input value and to multiply the scored input value by a fixed input weight to produce a reservoir input. For example, the reservoir layer 218 can be configured to receive the reservoir input and to perform one or more nonlinear operations on the reservoir input to realize the sensor fusion to produce a reservoir output. For example, the reservoir layer 218 can be configured as a recurrent neural network (RNN). For example, the output layer 220 can be configured to receive the reservoir output and to multiply the reservoir output by one or more trained output weights to produce one or more readout values.

For example, the reservoir computing network 208 can further include a random number generator 222. For example, the random number generator 222 can be configured to produce the fixed input weight and one or more fixed reservoir weights. For example, the input layer 216 can be further configured to receive the fixed input weight. For example, the reservoir layer is 218 can be further configured to receive the one or more fixed reservoir weights and to use the one or more fixed reservoir weights to perform the one or more nonlinear operations.

For example, the reservoir computing network 208 can include a physical reservoir computing network. A physical reservoir computing network can be implemented using hardware. For example, a physical reservoir computing network can consume less power and can be more efficient than a virtual reservoir computing network, which can be implemented using software.

For example, the reservoir layer 218 of the physical reservoir computing network can include one or more of: (1) a Boolean logic circuit implemented as a field-programmable gate array (FPGA), (2) a Boolean logic circuit implemented as an application-specific integrated circuit (ASIC), (3) an electrical reservoir scheme represented by a memristor device, (4) an electrical reservoir scheme represented by a spintronic device, (5) a photonic reservoir scheme, (6) a mechanical reservoir scheme, (7) a biological reservoir scheme, (8) a quantum system-based reservoir scheme, (9) a superconductor-based reservoir scheme, or (10) the like.

For example, the reservoir layer 218 of the physical reservoir computing network can include a Boolean logic circuit implemented as a FPGA. For example, additionally, at an operation 316, the energy management module 224 can control the FPGA to deactivate a portion of the FPGA in response to a determination of one or more of: (1) a lack of a need for the portion of the FPGA for an operation associated with the sensor fusion or (2) an existence of a situation in which information, included in the one or more readout values, having a reduced degree of precision is acceptable to control a movement of a vehicle. For example, if there is a lack of a need for the portion of the FPGA for an operation associated with the sensor fusion, then the portion of the FPGA can be deactivated to reduce power consumption by the reservoir layer 218. For example, the vehicle being in an idle state, rather than an active driving state, can be a situation in which information, included in the one or more readout values, having a reduced degree of precision is acceptable to control the movement of the vehicle.

For example, additionally, at an operation 318, the training module 226 can cause the output layer 220 to be trained so that the one or more trained output weights are set so that the one or more readout values are within a threshold of one or more desired readout values. For example, the output layer 220 can be trained using linear regression. Thus, with this approach, the reservoir computing network 208 can easily be trained and retrained to account for changes in performances of the sensors, changes in an environment of the vehicle, or the like.

For example, at an operation 320, the communications module 214 can cause the one or more readout values, based on the sensor fusion, to be communicated to an automated vehicle technology system to control the movement of the vehicle. For example, the one or more readout values can include one or more of a first readout value, a second readout value, or a third readout value. For example, the first readout value can include information useful for an operation, performed by the automated vehicle technology system, based on features extracted from the data produced by the sensors. For example, the second readout value can include information useful for a motion prediction operation performed by the automated vehicle technology system. For example, the third readout value can include information useful for a path planning operation performed by the automated vehicle technology system. For example, the path planning operation can include a long short-term memory (LSTM) neural network-based path planning operation. For example, the automated vehicle technology system can include one or more advanced driver-assistance systems (ADAS).

For example, additionally, at an operation 322, the low reliability response module 228 can determine that a reliability score is below a threshold value. For example, additionally, at an operation 324, the low reliability response module 228 can cause an influence of data produced by a corresponding sensor on information included in the one or more readout signals to be reduced. For example, additionally or alternatively, at an operation 326, the low reliability response module 228 can cause a switch to a fallback mode that prioritizes more reliable sensors.

For example, additionally or alternatively, at an operation 328, the low reliability response module 228 can determine that a reliability score, of the reliability scores, is below a first threshold value. For example, additionally, at an operation 330, the low reliability response module 228 can continuously monitor the reliability score with respect to a second threshold value. For example, additionally, at an operation 332, in response to a determination that the reliability score is less than the second threshold value, the low reliability response module 228 can cause an alert to be triggered. For example, additionally or alternatively, at an operation 334, the low reliability response module 228 can cause a switch to a failsafe mode.

In FIG. 3A, in the method 300, for example, additionally, at an operation 336, the preliminary processes module 230 can cause the data produced by each of the sensors to be converted into corresponding temporal signals. For example, additionally, at an operation 338, the preliminary processes module 230 can cause the corresponding temporal signals to be aligned. For example, additionally, at an operation 340, the preliminary processes module 230 can cause a size, of the reservoir layer 218 of the reservoir computing network 208, to be initialized to determine a count of a number of neurons to be used by the reservoir layer 218. For example, additionally, at an operation 342, the preliminary processes module 230 can cause a spectral radius to be selected to determine a maximum absolute value of a fixed reservoir weight used by the reservoir layer 218.

For example, additionally, at an operation 344, the preliminary processes module 230 can cause each of the corresponding temporal signals to be filtered to extract local features to be included in a corresponding set of feature maps. For example, additionally, at an operation 346, the preliminary processes module 230 can cause an operation to be performed on each of the corresponding set of feature maps to produce a pooled set of feature maps. For example, at the operation 344, the preliminary processes module 230 can cause a convolution around an item of data in a temporal signal of each of the corresponding temporal signals. For example, at the operation 344, the preliminary processes module 230 can cause the convolution by causing an elementwise multiplication to be performed. For example, the pooled set of feature maps can reduce a spatial size of an input to the reservoir computing network 208, which can reduce a number of parameters and computations to be performed by the reservoir computing network 208, which can control overfitting.

For example, additionally, at an operation 348, the communications module 214 can cause the data, produced by the sensors, to be communicated to a cloud computing platform.

For example, the cloud computing platform can be configured to operate a cloud-based reservoir computing network. For example, the cloud-based reservoir computing network can include a virtual reservoir computing network. A virtual reservoir computing network can be implemented using software. For example, a virtual reservoir computing network can be easier to reconfigure than a physical reservoir computing network, which can be implemented using hardware.

For example, the cloud-based reservoir computing network can be configured to: (1) receive: (a) the data produced by the sensors and (b) other data produced by other sensors of other vehicles and (2) process the data and the other data in the manner that realizes the sensor fusion to produce one or more cloud-based reservoir computing network readout values. For example, the one or more cloud-based reservoir computing network readout values can include one or more of a first readout value, a second readout value, a third readout value, or a fourth readout value. For example, the first readout value can include information useful for testing the reservoir computing network 208 for temporal validation. For example, the second readout value can include information useful for testing a characteristic of a sensor for a change in the characteristic due to an aging of the sensor. For example, the third readout value can include information useful for augmenting the data produced by the sensors with the other data produced by the other sensors of the other vehicles. For example, the fourth readout value can include information useful for training multiple models of reservoir layers.

For example, the cloud computing platform can be configured to train, using the fourth readout value, the multiple models of reservoir layers. For example, a model, of the multiple models of reservoir layers, can: (1) have one or more of a corresponding set of parameters or a corresponding starting point and (2) be associated with a corresponding characteristic that distinguishes the model from other models of the multiple models of reservoir layers.

For example, the cloud computing platform can be configured to cause one or more of the multiple models of reservoir layers to produce one or more fifth readout values. For example, the one or more fifth readout values can include information useful for modifying an operation of the reservoir computing network 208.

For example, the cloud computing platform can be configured to cause one or more of the first readout value, the second readout value, the third readout value, or the one or more fifth readout values to be communicated to one or more of the vehicle or one or more of the other vehicles.

For example, additionally, at an operation 350, the communications module 214 can cause the system 200 to receive one or more of: (1) the first readout value from the cloud computing platform, (2) the second readout value from the cloud computing platform, (3) the third readout value from the cloud computing platform, or (4) the one or more fifth readout values from the cloud computing platform.

For example, the first readout value from the cloud computing platform can be useful for causing the reservoir computing network 208 to be retrained in response to a determination that a measure of a performance of the reservoir computing network 208 with respect to temporal validation is outside of an acceptable range of measures of the performance.

For example, the second readout value from the cloud computing platform can be useful for causing the reservoir computing network 208 to be retrained in response to a determination that the change in the characteristic due to the aging of the sensor affects a performance of the reservoir computing network 208.

For example, because the third readout value includes information useful for augmenting the data produced by the sensors with the other data produced by the other sensors, the information included in the third readout value from the cloud computing platform can improve a performance of the reservoir computing network 208.

For example, the information included in the one or more fifth readout values from the cloud computing platform can be useful for modifying an operation of the reservoir computing network 208. For example, the information included in the one or more fifth readout values from the cloud computing platform can change one or more of: (1) a size, of the reservoir layer 218 of the reservoir computing network 208 or (2) a spectral radius of a fixed reservoir weight used by the reservoir layer 218.

Figure 4:
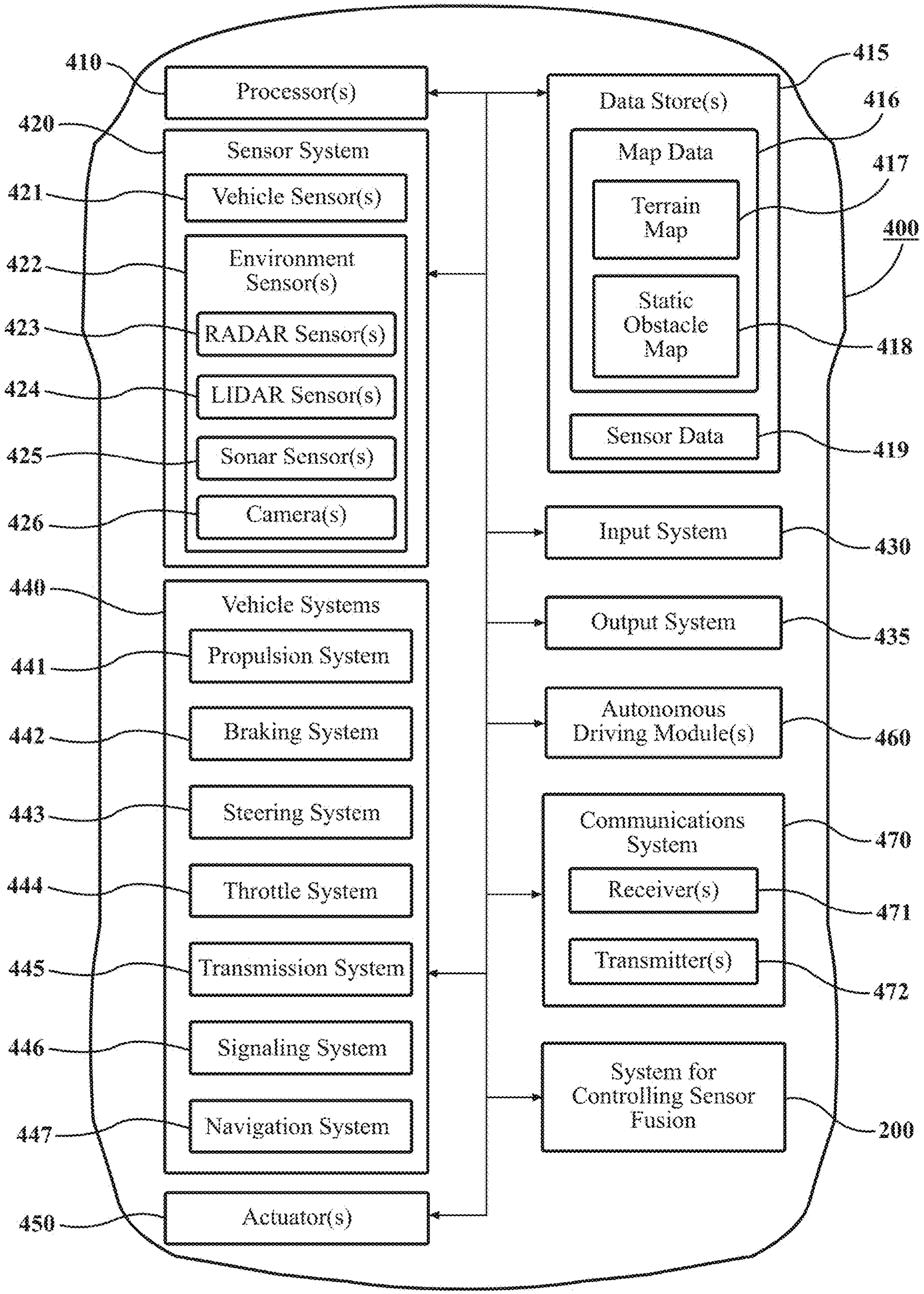
FIG. 4 includes a block diagram that illustrates an example of elements disposed on a vehicle, according to the disclosed technologies.

FIG. 4 includes a block diagram that illustrates an example of elements disposed on a vehicle 400, according to the disclosed technologies. As used herein, a "vehicle" can be any form of powered transport. In one or more implementations, the vehicle 400 can be an automobile. While arrangements described herein are with respect to automobiles, one of skill in the art understands, in light of the description herein, that embodiments are not limited to automobiles. For example, functions and/or operations of one or more of the first vehicle 112 (illustrated in FIG. 1), the second vehicle 114 (illustrated in FIG. 1), or the third vehicle 116 (illustrated in FIG. 1) can be realized by the vehicle 400.

In some embodiments, the vehicle 400 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 400 is performed according to inputs received from a user (e.g., human driver). In one or more arrangements, the vehicle 400 can be a conventional vehicle that is configured to operate in only a manual mode.

In one or more embodiments, the vehicle 400 can be an automated vehicle. As used herein, "automated vehicle" can refer to a vehicle that operates in an automated mode. As used herein, "automated mode" can refer to navigating and/or maneuvering the vehicle 400 along a travel route using one or more computing systems to control the vehicle 400 with minimal or no input from a human driver. In one or more embodiments, the vehicle 400 can be highly automated or completely automated. In one embodiment, the vehicle 400 can be configured with one or more semi-automated operational modes in which one or more computing systems perform a portion of the navigation and/or maneuvering of the vehicle along a travel route, and a vehicle operator (i.e., driver) provides inputs to the vehicle 400 to perform a portion of the navigation and/or maneuvering of the vehicle 400 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 400 can include various elements. The vehicle 400 can have any combination of the various elements illustrated in FIG. 4. In various embodiments, it may not be necessary for the vehicle 400 to include all of the elements illustrated in FIG. 4. Furthermore, the vehicle 400 can have elements in addition to those illustrated in FIG. 4. While the various elements are illustrated in FIG. 4 as being located within the vehicle 400, one or more of these elements can be located external to the vehicle 400. Furthermore, the elements illustrated may be physically separated by large distances. For example, as described, one or more components of the disclosed system can be implemented within the vehicle 400 while other components of the system can be implemented within a cloud-computing environment, as described below. For example, the elements can include one or more processors 410, one or more data stores 415, a sensor system 420, an input system 430, an output system 435, vehicle systems 440, one or more actuators 450, one or more automated driving modules 460, a communications system 470, and the system 200 for controlling sensor fusion.

In one or more arrangements, the one or more processors 410 can be a main processor of the vehicle 400. For example, the one or more processors 410 can be an electronic control unit (ECU). For example, functions and/or operations of the processor 202 (illustrated in FIG. 2) can be realized by the one or more processors 410.

The one or more data stores 415 can store, for example, one or more types of data. The one or more data stores 415 can include volatile memory and/or non-volatile memory. Examples of suitable memory for the one or more data stores 415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 415 can be a component of the one or more processors 410. Additionally or alternatively, the one or more data stores 415 can be operatively connected to the one or more processors 410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation. For example, functions and/or operations of one or more of the memory 204 (illustrated in FIG. 2) can be realized by the one or more data stores 415.

In one or more arrangements, the one or more data stores 415 can store map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain maps 417. The one or more terrain maps 417 can include information about the ground, terrain, roads, surfaces, and/or other features of one or more geographic areas. The one or more terrain maps 417 can include elevation data of the one or more geographic areas. The map data 416 can be high quality and/or highly detailed. The one or more terrain maps 417 can define one or more ground surfaces, which can include paved roads, unpaved roads, land, and other things that define a ground surface.

In one or more arrangements, the map data 416 can include one or more static obstacle maps 418. The one or more static obstacle maps 418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 418 can have location data, size data, dimension data, material data, and/or other data associated with them. The one or more static obstacle maps 418 can include measurements, dimensions, distances, and/or information for one or more static obstacles. The one or more static obstacle maps 418 can be high quality and/or highly detailed. The one or more static obstacle maps 418 can be updated to reflect changes within a mapped area.

In one or more arrangements, the one or more data stores 415 can store sensor data 419. As used herein, "sensor data" can refer to any information about the sensors with which the vehicle 400 can be equipped including the capabilities of and other information about such sensors. The sensor data 419 can relate to one or more sensors of the sensor system 420. For example, in one or more arrangements, the sensor data 419 can include information about one or more lidar sensors 424 of the sensor system 420.

In some arrangements, at least a portion of the map data 416 and/or the sensor data 419 can be located in one or more data stores 415 that are located onboard the vehicle 400. Additionally or alternatively, at least a portion of the map data 416 and/or the sensor data 419 can be located in one or more data stores 415 that are located remotely from the vehicle 400.

The sensor system 420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the one or more processors 410, the one or more data stores 415, and/or another element of the vehicle 400 (including any of the elements illustrated in FIG. 4). The sensor system 420 can acquire data of at least a portion of the external environment of the vehicle 400 (e.g., nearby vehicles). The sensor system 420 can include any suitable type of sensor. Various examples of different types of sensors are described herein. However, one of skill in the art understands that the embodiments are not limited to the particular sensors described herein.

The sensor system 420 can include one or more vehicle sensors 421. The one or more vehicle sensors 421 can detect, determine, and/or sense information about the vehicle 400 itself. In one or more arrangements, the one or more vehicle sensors 421 can be configured to detect and/or sense position and orientation changes of the vehicle 400 such as, for example, based on inertial acceleration. In one or more arrangements, the one or more vehicle sensors 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The one or more vehicle sensors 421 can be configured to detect and/or sense one or more characteristics of the vehicle 400. In one or more arrangements, the one or more vehicle sensors 421 can include a speedometer to determine a current speed of the vehicle 400.

Additionally or alternatively, the sensor system 420 can include one or more environment sensors 422 configured to acquire and/or sense driving environment data. As used herein, "driving environment data" can include data or information about the external environment in which a vehicle is located or one or more portions thereof. For example, the one or more environment sensors 422 can be configured to detect, quantify, and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400 such as, for example, lane markers, signs, traffic lights, traffic signs, lane lines, crosswalks, curbs proximate the vehicle 400, off-road objects, etc.

Various examples of sensors of the sensor system 420 are described herein. The example sensors may be part of the one or more vehicle sensors 421 and/or the one or more environment sensors 422. However, one of skill in the art understands that the embodiments are not limited to the particular sensors described.

In one or more arrangements, the one or more environment sensors 422 can include one or more radar sensors 423, one or more lidar sensors 424, one or more sonar sensors 425, and/or one more cameras 426. In one or more arrangements, the one or more cameras 426 can be one or more high dynamic range (HDR) cameras or one or more infrared (IR) cameras. For example, the one or more cameras 426 can be used to record a reality of a state of an item of information that can appear in the digital map. For example, functions and/or operations of one or more of the first sensor 118 (illustrated in FIG. 1), the second sensor 120 (illustrated in FIG. 1), the first sensor 126 (illustrated in FIG. 1), the second sensor 128 (illustrated in FIG. 1), the first sensor 134 (illustrated in FIG. 1), or the second sensor 136 (illustrated in FIG. 1) can be realized by the one or more environment sensors 422.

The input system 430 can include any device, component, system, element, arrangement, or groups thereof that enable information/data to be entered into a machine. The input system 430 can receive an input from a vehicle passenger (e.g., a driver or a passenger). The output system 435 can include any device, component, system, element, arrangement, or groups thereof that enable information/data to be presented to a vehicle passenger (e.g., a driver or a passenger).

Various examples of the one or more vehicle systems 440 are illustrated in FIG. 4. However, one of skill in the art understands that the vehicle 400 can include more, fewer, or different vehicle systems. Although particular vehicle systems can be separately defined, each or any of the systems or portions thereof may be otherwise combined or segregated via hardware and/or software within the vehicle 400. For example, the one or more vehicle systems 440 can include a propulsion system 441, a braking system 442, a steering system 443, a throttle system 444, a transmission system 445, a signaling system 446, and/or the navigation system 447. Each of these systems can include one or more devices, components, and/or a combination thereof, now known or later developed.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, a geolocation system, and/or a combination thereof.

The one or more actuators 450 can be any element or combination of elements operable to modify, adjust, and/or alter one or more of the vehicle systems 440 or components thereof responsive to receiving signals or other inputs from the one or more processors 410 and/or the one or more automated driving modules 460. Any suitable actuator can be used. For example, the one or more actuators 450 can include motors, pneumatic actuators, hydraulic pistons, relays, solenoids, and/or piezoelectric actuators.

The one or more processors 410 and/or the one or more automated driving modules 460 can be operatively connected to communicate with the various vehicle systems 440 and/or individual components thereof. For example, the one or more processors 410 and/or the one or more automated driving modules 460 can be in communication to send and/or receive information from the various vehicle systems 440 to control the movement, speed, maneuvering, heading, direction, etc. of the vehicle 400. The one or more processors 410 and/or the one or more automated driving modules 460 may control some or all of these vehicle systems 440 and, thus, may be partially or fully automated.

The one or more processors 410 and/or the one or more automated driving modules 460 may be operable to control the navigation and/or maneuvering of the vehicle 400 by controlling one or more of the vehicle systems 440 and/or components thereof. For example, when operating in an automated mode, the one or more processors 410 and/or the one or more automated driving modules 460 can control the direction and/or speed of the vehicle 400. The one or more processors 410 and/or the one or more automated driving modules 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 470 can include one or more receivers 471 and/or one or more transmitters 472. The communications system 470 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 470 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of one or more of the communications device 122 (illustrated in FIG. 1), the communications device 130 (illustrated in FIG. 1), the communications device 138 (illustrated in FIG. 1), or the communications device 206 (illustrated in FIG. 2) can be realized by the communications system 470.

Moreover, the one or more processors 410, the one or more data stores 415, and the communications system 470 can be configured to one or more of form a micro cloud, participate as a member of a micro cloud, or perform a function of a leader of a micro cloud. A micro cloud can be characterized by a distribution, among members of the micro cloud, of one or more of one or more computing resources or one or more data storage resources in order to collaborate on executing operations. The members can include at least connected vehicles.

The vehicle 400 can include one or more modules, at least some of which are described herein. The modules can be implemented as computer-readable program code that, when executed by the one or more processors 410, implement one or more of the various processes described herein. One or more of the modules can be a component of the one or more processors 410. Additionally or alternatively, one or more of the modules can be executed on and/or distributed among other processing systems to which the one or more processors 410 can be operatively connected. The modules can include instructions (e.g., program logic) executable by the one or more processors 410. Additionally or alternatively, the one or more data store 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include one or more automated driving modules 460. The one or more automated driving modules 460 can be configured to receive data from the sensor system 420 and/or any other type of system capable of capturing information relating to the vehicle 400 and/or the external environment of the vehicle 400. In one or more arrangements, the one or more automated driving modules 460 can use such data to generate one or more driving scene models. The one or more automated driving modules 460 can determine position and velocity of the vehicle 400. The one or more automated driving modules 460 can determine the location of obstacles, obstacles, or other environmental features including traffic signs, trees, shrubs, neighboring vehicles, pedestrians, etc.

The one or more automated driving modules 460 can be configured to receive and/or determine location information for obstacles within the external environment of the vehicle 400 for use by the one or more processors 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The one or more automated driving modules 460 can be configured to determine one or more travel paths, current automated driving maneuvers for the vehicle 400, future automated driving maneuvers and/or modifications to current automated driving maneuvers based on data acquired by the sensor system 420, driving scene models, and/or data from any other suitable source such as determinations from the sensor data 419. As used herein, "driving maneuver" can refer to one or more actions that affect the movement of a vehicle. Examples of driving maneuvers include: accelerating, decelerating, braking, turning, moving in a lateral direction of the vehicle 400, changing travel lanes, merging into a travel lane, and/or reversing, just to name a few possibilities. The one or more automated driving modules 460 can be configured to implement determined driving maneuvers. The one or more automated driving modules 460 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 460 can be configured to execute various vehicle functions and/or to transmit data to, receive data from, interact with, and/or control the vehicle 400 or one or more systems thereof (e.g., one or more of vehicle systems 440). For example, functions and/or operations of an automotive navigation system can be realized by the one or more automated driving modules 460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1, 2, 3A, 3B, and 4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component (e.g., a central processing unit (CPU), a graphics processing unit (GPU), a field-programmable gate array (FPGA), or the like) that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method, comprising:

causing, by a processor, a spectral radius to be selected to determine a maximum absolute value of a fixed reservoir weight used by a reservoir layer of a reservoir computing network;

calculating, by the processor, reliability scores for sensors;

multiplying, by the processor, values of data, produced by the sensors, by the reliability scores to produce a scored input value;

performing, by the processor, sensor fusion by processing the scored input value with the reservoir computing network; and causing, by the processor, at least one readout value, based on the sensor fusion, to be communicated to an automated vehicle technology system to control a movement of a vehicle.

2. The method of claim 1, wherein the at least one readout value comprises at least one of:

a first readout value, wherein the first readout value includes information usable for an operation, performed by the automated vehicle technology system, based on features extracted from the data produced by the sensors, a second readout value, wherein the second readout value includes information usable for a motion prediction operation performed by the automated vehicle technology system, or a third readout value, wherein the third readout value includes information usable for a path planning operation performed by the automated vehicle technology system.

3. A non-transitory computer-readable medium for controlling sensor fusion, the non-transitory computer-readable medium including instructions that, when executed by one or more processors, cause the one or more processors to:

cause a spectral radius to be selected to determine a maximum absolute value of a fixed reservoir weight used by a reservoir layer of a reservoir computing network;

calculate reliability scores for sensors;

multiply values of data, produced by the sensors, by the reliability scores to produce a scored input value;

perform sensor fusion by processing the scored input value with the reservoir computing network; and cause at least one readout value, based on the sensor fusion, to be communicated to an automated vehicle technology system to control a movement of a vehicle.

4. A system, comprising:

a processor; and a memory storing:

a preliminary processes module including instructions that, when executed by the processor, cause the processor to cause a spectral radius to be selected to determine a maximum absolute value of a fixed reservoir weight used by a reservoir layer of a reservoir computing network; and a sensor data adjustment module including instructions that, when executed by the processor, cause the processor to:
calculate reliability scores for sensors; and
multiply values of data, produced by the sensors, by the reliability scores to produce a scored input value;
a sensor fusion module including instructions that, when executed by the processor, cause the processor to perform sensor fusion by processing the scored input value with the reservoir computing network; and
a communications module including instructions that, when executed by the processor, cause at least one readout value, based on the sensor fusion, to be communicated to an automated vehicle technology system to control a movement of a vehicle.

5. The system of claim 4, wherein the reservoir computing network comprises:
an input layer configured to receive the scored input value and to multiply the scored input value by a fixed input weight to produce a reservoir input;
the reservoir layer configured to receive the reservoir input and to perform at least one nonlinear operation on the reservoir input to realize the sensor fusion to produce a reservoir output; and
an output layer configured to receive the reservoir output and to multiply the reservoir output by at least one trained output weight to produce the at least one readout value.

6. The system of claim 5, wherein:
the reservoir computing network further comprises a random number generator configured to produce the fixed input weight and at least one fixed reservoir weight,
the input layer is further configured to receive the fixed input weight, and
the reservoir layer is further configured to receive the at least one fixed reservoir weight and to use the at least one fixed reservoir weight to perform the at least one nonlinear operation.

7. The system of claim 4, wherein the reservoir computing network comprises a physical reservoir computing network.

8. The system of claim 7, wherein:
the reservoir layer of the physical reservoir computing network comprises a Boolean logic circuit implemented as a field-programmable gate array, and
the memory further stores an energy management module including instructions that, when executed by the processor, cause the processor to control the field-programmable gate array to deactivate a portion of the field-programmable gate array in response to a determination of at least one of:
a lack of a need for the portion of the field-programmable gate array for an operation associated with the sensor fusion, or
an existence of a situation in which information, included in the at least one readout value, having a reduced degree of precision is acceptable to control the movement of the vehicle.

9. The system of claim 4, wherein:
a reliability score, of the reliability scores, comprises a function of at least one of:
a measure of a noise associated with a corresponding sensor,
a measure of a latency associated with the data produced by the corresponding sensor, or
a measure of a cross-verification of the data produced by the corresponding sensor with data produced by another source, and
the sensor data adjustment module further includes instructions to:
calculate the measure of the noise,
calculate the measure of the latency, or
calculate the measure of the cross-verification.

10. The system of claim 9, wherein:
the measure of the noise comprises a measure of the data produced by the corresponding sensor over a moving window of time, the measure of the data comprising at least one of a variance of the data or a standard deviation of the data,
the measure of the latency comprises a measure of a duration of time of the corresponding sensor to respond to a physical condition expected to be detected by the corresponding sensor, or
the other source comprises at least one of another sensor or a model that produces a prediction.

11. The system of claim 9, wherein the function comprises a sum of at least two of:
a first product, wherein the first product is a product of a first weight multiplied by a normalized measure of the noise,
a second product, wherein the second product is a product of a second weight multiplied by a normalized measure of the latency, or
a third product, wherein the third product is of a third weight multiplied by the measure of the cross-verification.

12. The system of claim 4, wherein the memory further stores a low reliability response module including instructions that, when executed by the processor, cause the processor to:
determine that a reliability score, of the reliability scores, is below a threshold value; and
at least one of:
cause an influence of data produced by a corresponding sensor on information included in the at least one readout signal to be reduced, or
cause a switch to a fallback mode that prioritizes more reliable sensors.

13. The system of claim 4, wherein the memory further stores a low reliability response module including instructions that, when executed by the processor, cause the processor to:
determine that a reliability score, of the reliability scores, is below a first threshold value;
continuously monitor the reliability score with respect to a second threshold value; and
in response to a determination that the reliability score is less than the second threshold value, at least one of:
cause an alert to be triggered, or
cause a switch to a failsafe mode.

14. The system of claim 4, wherein the preliminary processes module further includes instructions to:
cause the data produced by each of the sensors to be converted into corresponding temporal signals;
cause the corresponding temporal signals to be aligned; and
cause a size, of the reservoir layer, to be initialized to determine a count of a number of neurons to be used by the reservoir layer.

15. The system of claim 14, wherein the preliminary processes module further includes instructions to:

cause each of the corresponding temporal signals to be filtered to extract local features to be included in a corresponding set of feature maps; and cause an operation to be performed on each of the corresponding set of feature maps to produce a pooled set of feature maps.

16. The system of claim 4, wherein:

the communications module further includes instructions to cause the data, produced by the sensors, to be communicated to a cloud computing platform; and the cloud computing platform is configured to:

operate a cloud-based reservoir computing network configured to:

receive:

the data produced by the sensors, and other data produced by other sensors of other vehicles, and process the data and the other data in the manner that realizes the sensor fusion to produce at least one cloud-based reservoir computing network readout value, wherein the at least one cloud-based reservoir computing network readout value comprises a fourth readout value, wherein the fourth readout value includes information usable for training multiple models of reservoir layers, and at least one of:

a first readout value, wherein the first readout value includes information usable for testing the reservoir computing network for temporal validation, a second readout value, wherein the second readout value includes information usable for testing a characteristic of a sensor, of the sensors, for a change in the characteristic due to an aging of the sensor, or a third readout value, wherein the third readout value includes information usable for augmenting the data produced by the sensors with the other data produced by the other sensors of the other vehicles;

train, using the fourth readout value, the multiple models of reservoir layers, wherein a model, of the multiple models of reservoir layers:

has at least one of a corresponding set of parameters or a corresponding starting point, and is associated with a corresponding characteristic that distinguishes the model from other models of the multiple models of reservoir layers;

cause at least one of the multiple models of reservoir layers to produce at least one fifth readout value, wherein the at least one fifth readout value includes information usable for modifying an operation of the reservoir computing network; and cause at least one of the first readout value, the second readout value, the third readout value, or the at least one fifth readout value to be communicated to at least one of the vehicle or at least one of the other vehicles.

17. The system of claim 16, wherein the communications module further includes instructions to cause the system to receive the first readout value.

18. The system of claim 16, wherein the communications module further includes instructions to cause the system to receive the second readout value.

19. The system of claim 16, wherein the communications module further includes instructions to cause the system to receive the third readout value.

20. The system of claim 16, wherein the communications module further includes instructions to cause the system to receive at least one of the at least one fifth readout value.

* * * * *